(12) United States Patent
Nakanishi

(10) Patent No.: US 11,405,514 B2
(45) Date of Patent: Aug. 2, 2022

(54) ELECTRONIC APPARATUS AND IMAGE FORMING APPARATUS

(71) Applicant: KYOCERA Document Solutions Inc., Osaka (JP)

(72) Inventor: Shinichi Nakanishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/292,381

(22) PCT Filed: Sep. 13, 2019

(86) PCT No.: PCT/JP2019/036067
§ 371 (c)(1),
(2) Date: May 7, 2021

(87) PCT Pub. No.: WO2020/100404
PCT Pub. Date: May 22, 2020

(65) Prior Publication Data
US 2022/0014638 A1    Jan. 13, 2022

(30) Foreign Application Priority Data

Nov. 15, 2018  (JP) .............................. JP2018-214941

(51) Int. Cl.
*H04N 1/00* (2006.01)
(52) U.S. Cl.
CPC ....... *H04N 1/00482* (2013.01); *H04N 1/0097* (2013.01); *H04N 2201/0094* (2013.01)
(58) Field of Classification Search
None
See application file for complete search history.

(56) References Cited

U.S. PATENT DOCUMENTS

| 2002/0030840 | A1 | 3/2002 | Itaki et al. |
| 2006/0114509 | A1 | 6/2006 | Itaki et al. |
| 2006/0132845 | A1 | 6/2006 | Itaki et al. |
| 2014/0325360 | A1* | 10/2014 | Jung ...................... G09B 21/00 715/728 |
| 2017/0099406 | A1* | 4/2017 | Odaira ............... H04N 1/00477 |
| 2020/0084390 | A1* | 3/2020 | Sato ................... H04N 5/23216 |

FOREIGN PATENT DOCUMENTS

| JP | 2002-165057 A | 6/2002 |
| JP | 2006-012307 A | 1/2006 |
| JP | 2007-102497 A | 4/2007 |
| JP | 2011-113376 A | 6/2011 |

\* cited by examiner

*Primary Examiner* — Frantz Bataille
(74) *Attorney, Agent, or Firm* — IP Business Solutions, LLC

(57) ABSTRACT

An image forming apparatus includes a display device that displays a plurality of setting items related to an operation of an electronic apparatus, an operation device and a touch panel to be operated by a user, and a controller that sets a value of each of the setting items on a screen of the display device according to an input made through the operation device and the touch panel, initializes the values of the respective setting items, when a total reset mode is set through the operation device and the touch panel, and initializes, when an individual reset mode is set through the operation device and the touch panel, and resetting of the setting items on the screen of the display device is instructed through the touch panel, the value of the setting item about which the resetting has been instructed.

8 Claims, 14 Drawing Sheets

| ITEM | VALUE |
|---|---|
| SHEET SIZE | A4 |
| DENSITY | MEDIUM |
| COLOR OR B/W | B/W |
| SCALING | 100% |
| ⋮ | ⋮ |

TD

| ITEM | VALUE |
|---|---|
| SHEET SIZE | A4 |
| DENSITY | MEDIUM |
| COLOR OR B/W | B/W |
| SCALING | 100% |
| ⋮ | ⋮ |

HD

| ITEM | VALUE | VALUE |
|---|---|---|
| SHEET SIZE | ... | ... |
| DENSITY | ... | ... |
| COLOR OR B/W | ... | ... |
| SCALING | ... | ... |
| ⋮ | ⋮ | ⋮ |

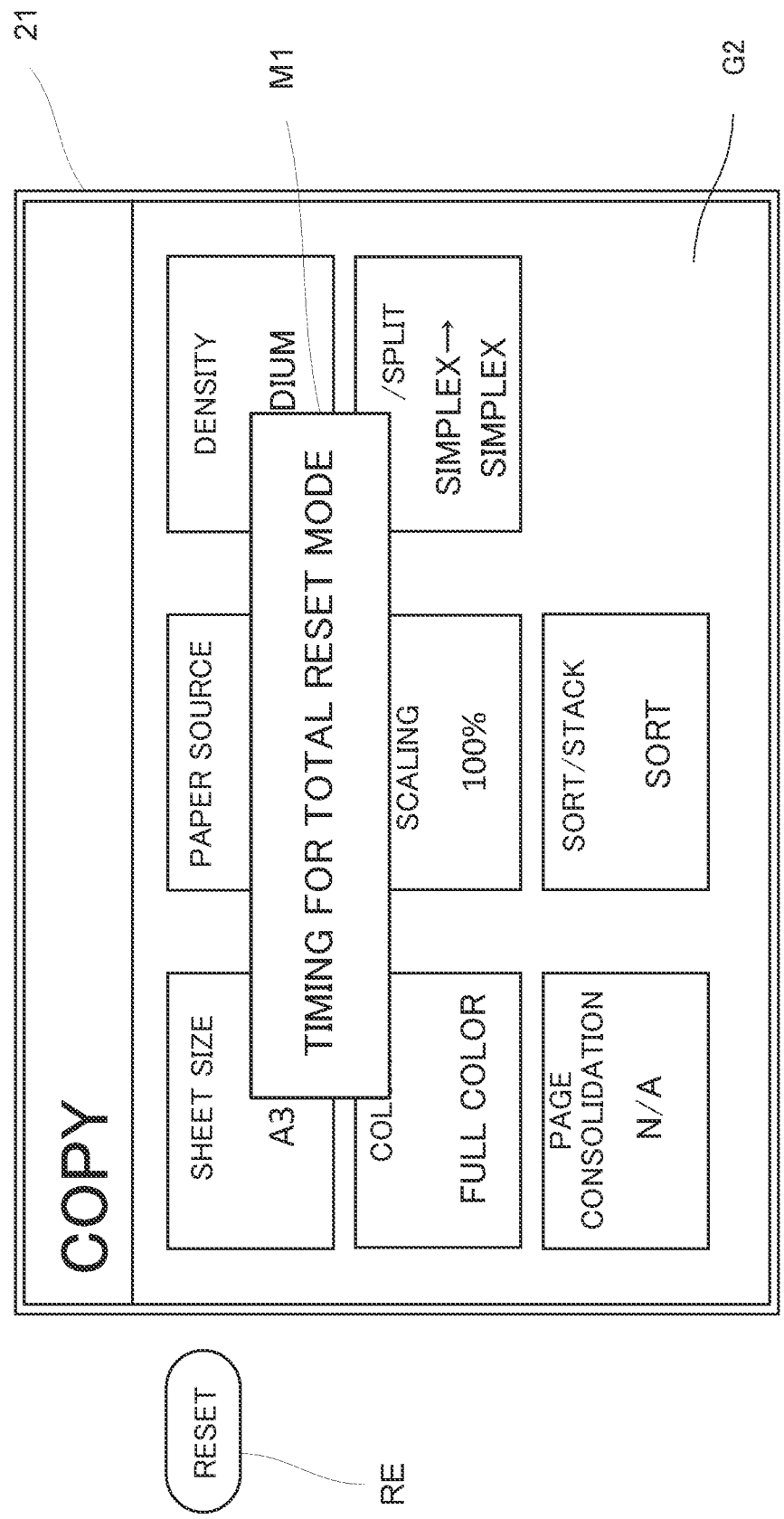

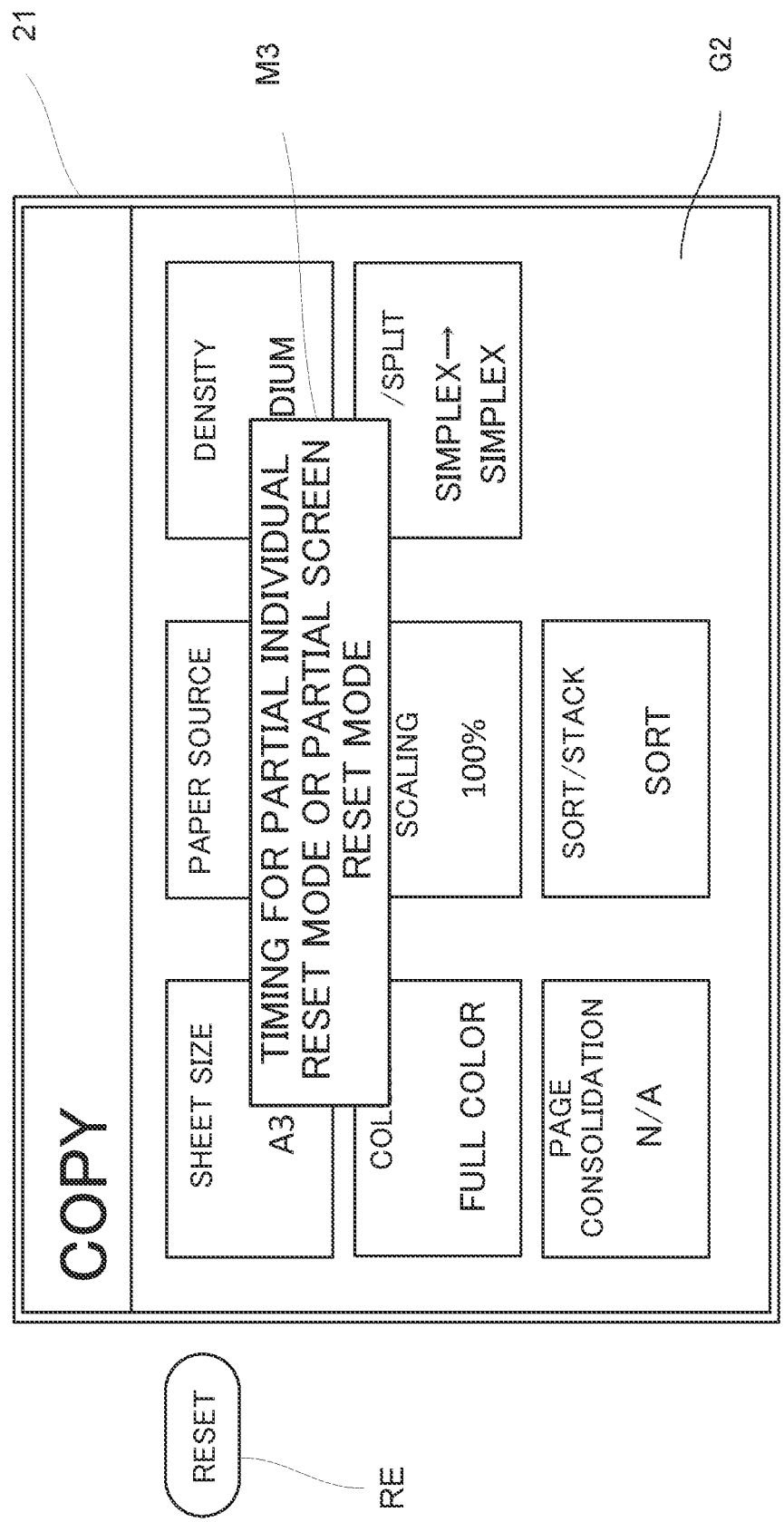

Fig.9

| ITEM | VALUE |
|---|---|
| SHEET SIZE | A4 |
| DENSITY | MEDIUM |
| COLOR OR B/W | B/W |
| SCALING | 100% |

SD

| ITEM | VALUE |
|---|---|
| SHEET SIZE | A3 |
| DENSITY | DARK |
| COLOR OR B/W | COLOR |
| SCALING | 75% |

TD

| ITEM | VALUE |
|---|---|
| SHEET SIZE | A4 |
| DENSITY | DARK |
| COLOR OR B/W | COLOR |
| SCALING | 75% |

TD

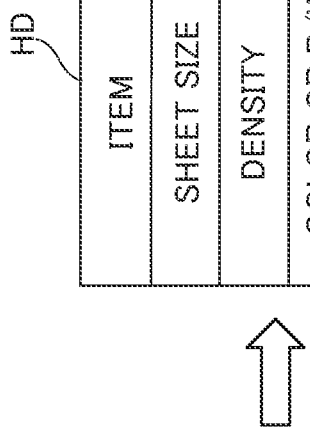
Fig. 10A
Fig. 10B

| ITEM | VALUE |
|---|---|
| SHEET SIZE | B5 |
| DENSITY | DARK |
| COLOR OR B/W | COLOR |
| SCALING | 100% |
| ... | ... |

TD
START

| ITEM | VALUE | VALUE |
|---|---|---|
| SHEET SIZE | A4 | B5 |
| DENSITY | MEDIUM | DARK |
| COLOR OR B/W | B/W | COLOR |
| SCALING | 100% | 100% |
| ... | ... | ... |

HD

| ITEM | VALUE |
|---|---|
| SHEET SIZE | A4 |
| DENSITY | DARK |
| COLOR OR B/W | COLOR |
| SCALING | 100% |
| ... | ... |

TD
SWIPE

A4

| ITEM | VALUE | VALUE |
|---|---|---|
| SHEET SIZE | ... | B5 |
| DENSITY | MEDIUM | DARK |
| COLOR OR B/W | B/W | COLOR |
| SCALING | 100% | 100% |
| ... | ... | ... |

HD

ELECTRONIC APPARATUS AND IMAGE FORMING APPARATUS

TECHNICAL FIELD

The present invention relates to a technique to allow a user to initialize, through an operation device, a value of each of a plurality of setting items related to an operation of an electronic apparatus.

BACKGROUND ART

In an image forming apparatus, exemplifying the electronic apparatus, an initialized value is preset for each of the plurality of setting item, such as printing density of the image, a scaling factor of the image, and a recording sheet size, for example in the case of a printing job, and the user can change the value of the setting item, when executing the copying job. However, in the case where the changed values of the respective setting items are collectively initialized at a time, after the user changed the value of the majority of the setting items, the user has to input the value of all those setting items again, which is a troublesome work.

Accordingly, Patent Literature (PTL) 1 discloses a technique to keep unchanged the set values for the printer specified on a print operation screen but reset (initialize) only the setting of an output format, when the operator presses a reset button once on the print operation screen, and to reset all the set values for the printer and setting of the output format, when the operator consecutively presses the reset button twice. In other words, the setting is reset in different ways, depending on whether the reset button has been pressed once or twice. Such an arrangement improves the operability of the setting work.

CITATION LIST

Patent Literature

PTL 1: Japanese Unexamined Patent Application Publication No. 2002-165057

SUMMARY OF INVENTION

Technical Problem

However, no reference is made in PTL 1 to a technique to individually reset each of the setting items related to the operation of the apparatus. PTL 1 only teaches the technique to change the mode of resetting the set values for the printer and setting of the output format, depending on the number of times that the reset button has been pressed, and is therefore unapplicable to the case of individually resetting each of the setting items related to the operation of the apparatus.

The present invention has been accomplished in view of the foregoing situation, and proposes a technique to select a value for each of a plurality of setting items related to the operation of an electronic apparatus, and initialize the value for each of the setting items.

Solution to Problem

In an aspect, the present invention provides an electronic apparatus including a controller that sets a value for each of a plurality of setting items related to an operation of the electronic apparatus, a display device that displays the plurality of setting items, and an operation device to be operated by a user. The controller sets the value of each of the setting items according to an input made through the operation device, initializes the respective values of all the setting items, when a total reset mode is set through the operation device, and initializes, when an individual reset mode is set through the operation device, the value of the setting item about which resetting has been instructed through the operation device, out of the setting items displayed on a screen of the display device.

In another aspect, the present invention provides an image forming apparatus including the foregoing electronic apparatus, and an image forming device that forms an image on a recording medium.

Advantageous Effects of Invention

With the foregoing arrangement, the respective values of the plurality of setting items, related to the operation of the electronic apparatus, can be selectively initialized.

BRIEF DESCRIPTION OF DRAWINGS

FIG. 3 schematically shows an initial value data table, a set value data table, and a history data table.

FIG. 7A is a schematic drawing showing a message displayed on the display device, according to a press duration time of a reset key.

FIG. 7C is a schematic drawing showing another message displayed on the display device, according to the press duration time of the reset key.

FIG. 9 schematically shows the tables for explaining the process of initializing the set value data table, under an individual reset mode.

FIG. 10A schematically shows the tables for explaining a process of reinstating the values of the setting items of the set value data table, utilizing the history data table under the individual reset mode.

FIG. 10B schematically shows the tables for explaining another process of reinstating the values of the setting items of the set value data table, utilizing the history data table under the individual reset mode.

DESCRIPTION OF EMBODIMENT

Hereafter, an electronic apparatus and an image forming apparatus according to an embodiment of the present invention will be described, with reference to the drawings.

Figure 1:
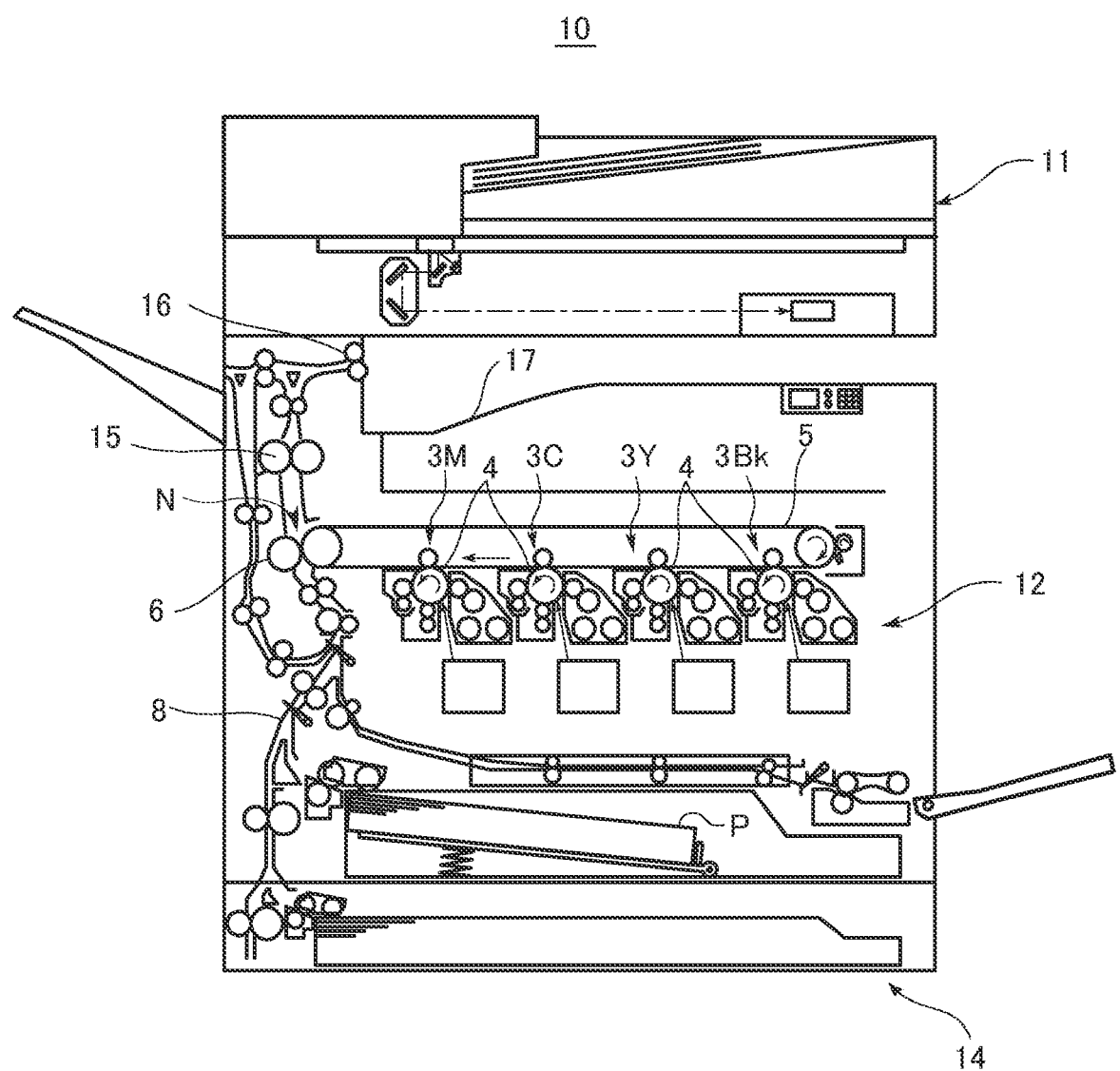
FIG. 1 is a cross-sectional view showing an image forming apparatus according to an embodiment of the present invention.

FIG. 1 is a cross-sectional view showing the image forming apparatus according to the embodiment of the present invention. The image forming apparatus 10 shown in FIG. 1, exemplifying the electronic apparatus according to the present invention, is a multifunction peripheral (MFP) having a plurality of functions such as a copying function, a printing function, and a facsimile function. The image forming apparatus 10 includes an image reading device 11 and an image forming device 12.

The image reading device 11 includes an image sensor that optically reads the source document image, and the analog output from the image sensor is converted into a digital signal, so that image data representing the source document image is generated.

The image forming device 12 is configured to print an image represented by the image data on a recording sheet, and includes an image forming unit 3M for magenta, an image forming unit 3C for cyan, an image forming unit 3Y for yellow, and an image forming unit 3Bk for black. In each of the image forming units 3M, 3C, 3Y, and 3Bk, the surface of a photoconductor drum 4 is uniformly charged, and an electrostatic latent image is formed on the surface of the photoconductor drum 4 by exposure. Then the electrostatic latent image on the surface of the photoconductor drum 4 is developed into a toner image, and the toner image on the photoconductor drum 4 is transferred to an intermediate transfer roller 5, as primary transfer. Thus, the color toner image is formed on the intermediate transfer roller 5. The color toner image is transferred, as secondary transfer, to the recording sheet P transported along a transport route 8 from a paper feeding device 14, at a nip region N defined between the intermediate transfer roller 5 and a secondary transfer roller 6.

Thereafter, the recording sheet P is press-heated in a fixing device 15, so that the toner image on the recording sheet P is fixed by thermal compression, and then the recording sheet P is discharged to an output tray 17 through a discharge roller 16.

Figure 2:
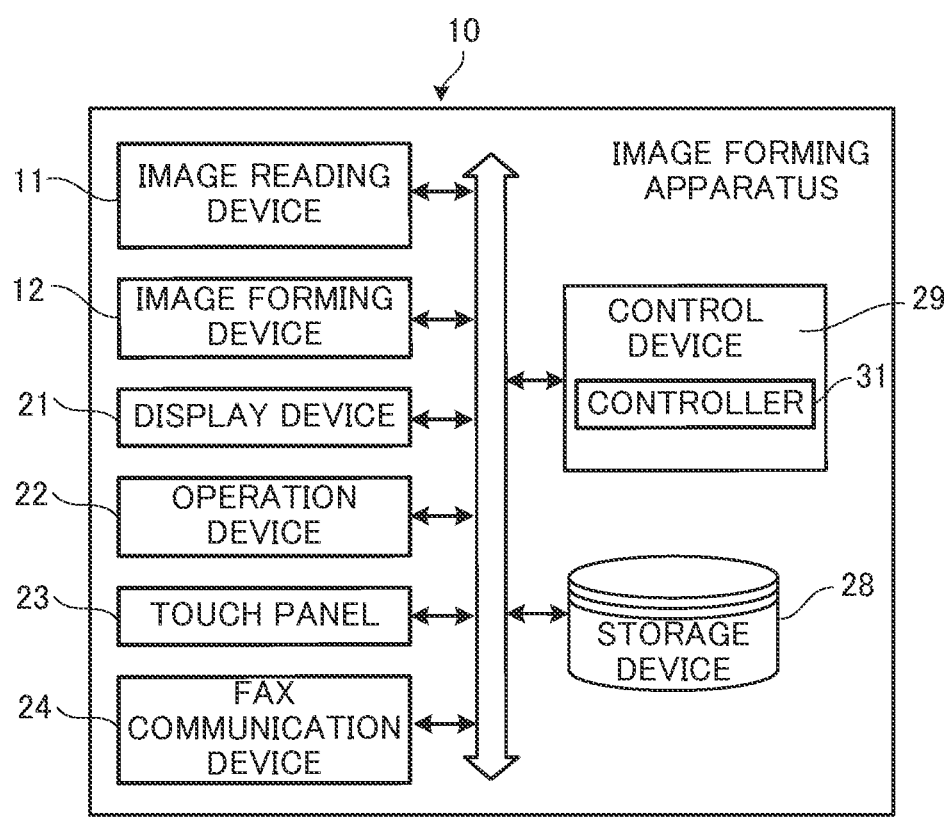
FIG. 2 is a block diagram showing an essential internal configuration of the image forming apparatus according to the embodiment.

Hereunder, a configuration related to the control of the image forming apparatus 10 will be described. FIG. 2 is a block diagram showing an essential internal configuration of the image forming apparatus 10. As shown in FIG. 2, the image forming apparatus 10 according to this embodiment includes the image reading device 11, the image forming device 12, a display device 21, an operation device 22, a touch panel 23, a facsimile communication device 24, a storage device 28, and a control device 29. The mentioned components are configured to transmit and receive data or signals to and from each other, via a bus.

The display device 21 is, for example, constituted of a liquid crystal display (LCD) or an organic light-emitting diode (OLED) display.

The operation device 22 includes physical keys such as a ten key, an enter key, a start key, and a reset key.

The touch panel 23 is overlaid on the screen of the display device 21. The touch panel 23 is based on a resistive film or electrostatic capacitance, and configured to detect a contact (touch) of the user's finger, along with the touched position, and outputs a detection signal indicating the coordinate of the touched position, to a controller 31 of the control device 29 to be subsequently described.

The facsimile communication device (FAX communication device) 24 transmits and receives the image data via a network, to and from another image forming apparatus or facsimile machine (not shown).

The storage device 28 is a large-capacity storage device such as a solid-state drive (SSD) or a hard disk drive (HDD), and contains various application programs and various types of data.

The control device 29 includes a processor, a random-access memory (RAM), a read-only memory (ROM), and so forth. The processor is, for example, a central processing unit (CPU), an application specific integrated circuit (ASIC), or a micro processing unit (MPU). The control device 29 acts as a controller 31, when the processor executes a control program stored in the ROM or the storage device 28.

The control device 29 executes overall control of the image forming apparatus 10. The control device 29 is connected to the image reading device 11, the image forming device 12, the display device 21, the operation device 22, the touch panel 23, the facsimile communication device 24, and the storage device 28, to control the operation of the mentioned components, and transmit and receive data and signals to and from each of those components.

The controller 31 serves as a processing device that executes various operations necessary for the image forming to be performed by the image forming apparatus 10. Further, the controller 31 receives operational instructions inputted by the user, in the form of a detection signal outputted from the touch panel 23, or through a press of a physical key of the operation device 22. Further, the controller 31 is configured to control the displaying operation of the display device 21, and the communicating operation of the facsimile communication device 24.

With the image forming apparatus 10 configured as above, the user can select the job to be performed out of the facsimile communication function, the copying function, the printing function, and the scanning function, through the operation device 22 and the touch panel 23. For example, when the user selects the copying function and instructs to execute the job, the controller 31 causes the image reading device 11 to read the image of the source document. and causes the image forming device 12 to form the image of the document on the recording sheet. In the case of the facsimile communication function, the printing function, and the scanning function, likewise, when the user selects the function and instructs to execute the job, the controller 31 executes the instructed job.

In the image forming apparatus 10, the storage device 28 contains an initial value data table SD, in which the setting items related to the operation of the image forming apparatus are specified. About the copying function for example, the controller 31 stores the respective values (initial values) of a plurality of setting items, such as the printing density, the scaling factor, and the recording sheet size, in the initial value data table SD of the storage device 28. When the image forming apparatus 10 is started up, the controller 31 loads the values of the respective setting items in the initial value data table SD on a set value data table TD. The set value data table TD is generated and stored, for example, in the RAM of the control device 29.

The controller 31 changes the values of the respective setting items stored in the set value data table TD according to the instruction of the user, before executing the copying job. When a setup screen including the setting items is displayed on the display device 21, the user can input an instruction to change the value of the setting item, by a touch on the setup screen. The controller 31 receives the instruction through the touch panel 23, and changes the value of the setting item in the set value data table TD, to the inputted value. When the user presses the start key of the operation device 22, the controller 31 causes the image forming device 12 to print the image of the source document on the recording sheet, according to the values of the respective setting items specified in the set value data table TD.

FIG. 3 schematically illustrates the initial value data table SD and the set value data table TD. As shown in FIG. 3, the values (initial values) of the respective setting items are stored in the initial value data table SD, by the controller 31. Those values of the setting items are also stored in the set value data table TD, and the values in this table can be changed. A history data table HD shown in FIG. 3 will be subsequently described.

In the case where, after the user changes the values of the majority of the setting items in the set value data table TD, the values of all the setting items in the set value data table TD are collectively initialized at a time, the user has to input the values of all the setting items again, which is a troublesome work.

In this embodiment, accordingly, the user can select one of a total reset mode, an individual reset mode, a screen reset mode, a partial individual reset mode, and a partial screen reset mode, through the operation device 22 and the touch panel 23, so that the controller 31 performs the resetting, in the selected reset mode.

For example, when the total reset mode is set, the controller 31 initializes the values of all the setting items in the set value data table TD, by changing the values of all the setting items in the set value data table TD to the values of the respectively corresponding setting items in the initial value data table SD.

When the user performs, under the individual reset mode, a predetermined touch operation (e.g., swipe operation) on a selected setting item displayed on the setup screen of the display device 21, the controller 31 detects, through the touch panel 23, the swipe operation performed on the selected setting item, and initializes the value of the selected setting item in the set value data table TD, by changing the value of the selected setting item in the set value data table TD, to the value of the corresponding setting item in the initial value data table SD.

When the user presses the start key of the operation device 22 under the individual reset mode, the controller 31 executes the job, and stores the values of the respective setting items in the set value data table TD used for the job that has been executed, for example in the history data table HD, as history information. When the user performs, to execute a subsequent job, a swipe operation, an example of the predetermined touch operation (hereinafter, simply "swipe operation"), on a selected setting item displayed on the setup screen of the display device 21, the controller 31 detects, through the touch panel 23, the swipe operation performed on the selected setting item, and replaces the value of the selected setting item in the set value data table TD, with the value of the corresponding setting item in the history data table HD.

When the screen reset mode is set, the controller 31 selects the setting items displayed on the setup screen of the display device 21 (all of the setting items displayed on the setup screen of the display device 21), and initializes the values of the respective setting items selected, by changing the values of the setting items in the set value data table TD, to the values of the respectively corresponding setting items in the initial value data table SD.

When the user performs, under the partial individual reset mode, a swipe operation on a selected setting item displayed on the setup screen of the display device 21, the controller 31 detects, through the touch panel 23, the swipe operation performed on the selected setting item. The controller 31 then selects the remaining setting items displayed on the setup screen of the display device 21, other than the selected setting item, and initializes the respective values of the remaining setting items, by changing the values of the remaining items in the set value data table TD, to the values of the respectively corresponding setting items in the initial value data table SD.

When the partial screen reset mode is set, the controller 31 selects the values of the respective setting items displayed on another setup screen of the display device 21, other than the setting items on the currently displayed setup screen of the display device 21, and initializes the values of the other setting items, by changing the values of the other setting items in the set value data table TD, to the values of the respectively corresponding setting items in the initial value data table SD. Here, the partial screen reset mode is applicable to the case where a plurality of setup screens associated with the same function are alternately displayed on the display device 21. The controller 31 selects the other of the setup screens, except the setup screen currently displayed on the display device 21, and initializes the values of the other setting items on the other setup screen.

Thus, the user can selectively initialize the values of the respective setting items in the set value data table TD, by selecting one of the foregoing modes, and causing the apparatus to perform the resetting under the selected mode.

Referring now to flowcharts shown in FIG. 4A and FIG. 4B, the process of initializing the values of the setting items will be described, with respect to each of the modes.

Figure 5:
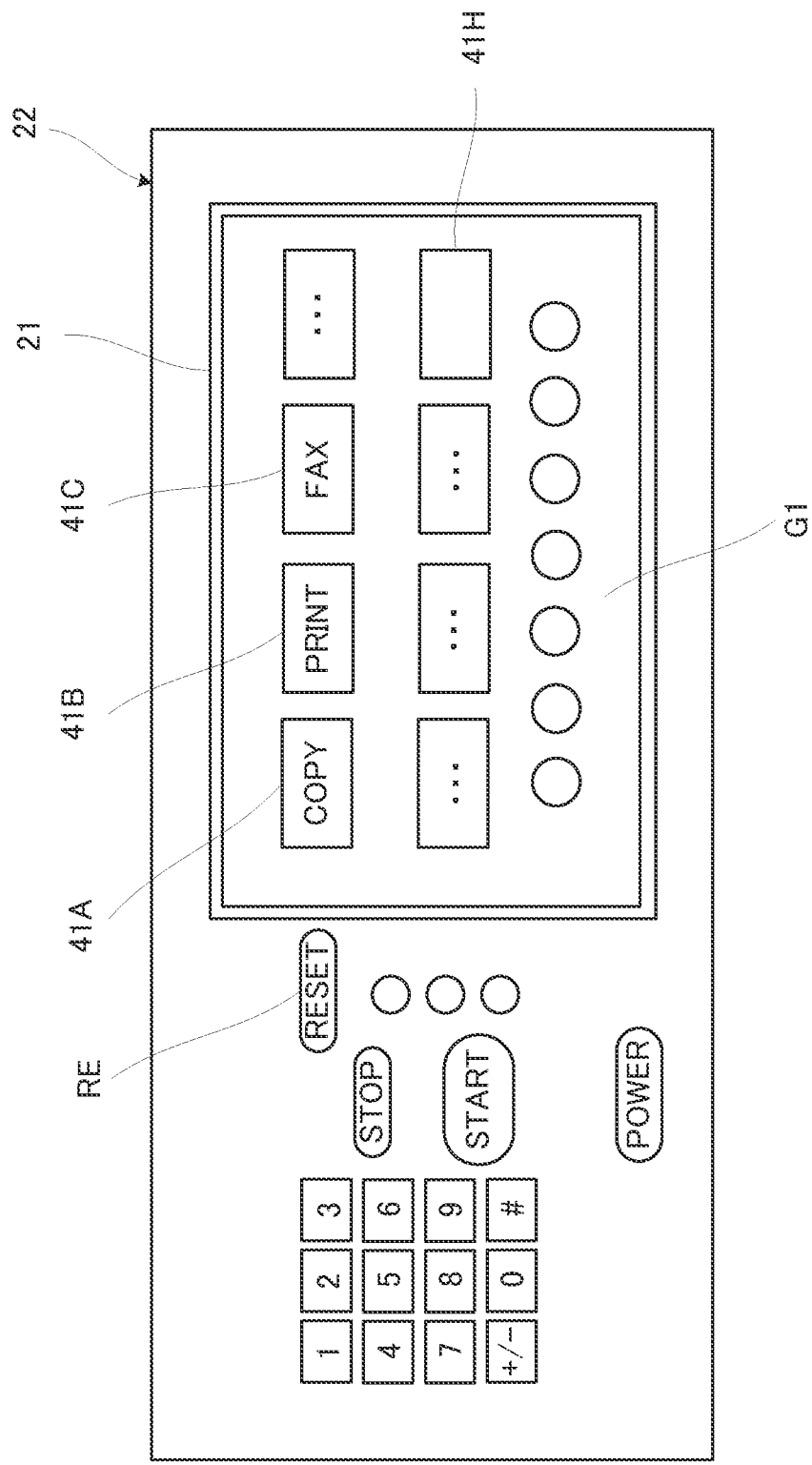
FIG. 5 is a schematic drawing showing an initial screen displayed on a display device.

It will be assumed here that an initial screen G1 shown in FIG. 5 is displayed, under the control of the controller 31 (S101). The initial screen G1 includes a plurality of function keys 41A to 41H, associated with the respective functions. For example, the function key 41A is associated with the copying function, the function key 41B is associated with the printing function, the function key 41C is associated with the facsimile function, and the remaining keys 41D to 41H are each associated with one of the other functions. When the user touches a selected function key, the controller 31 detects, through the touch panel 23, the touch operation performed on the selected function key, and causes the display device 21 to display the setup screen (S102), for the user to input the values of the respective setting items related to the function associated with the touched function key. The setup screen includes a plurality of setting items, the respective values of which are stored in the set value data table TD.

Figure 6:
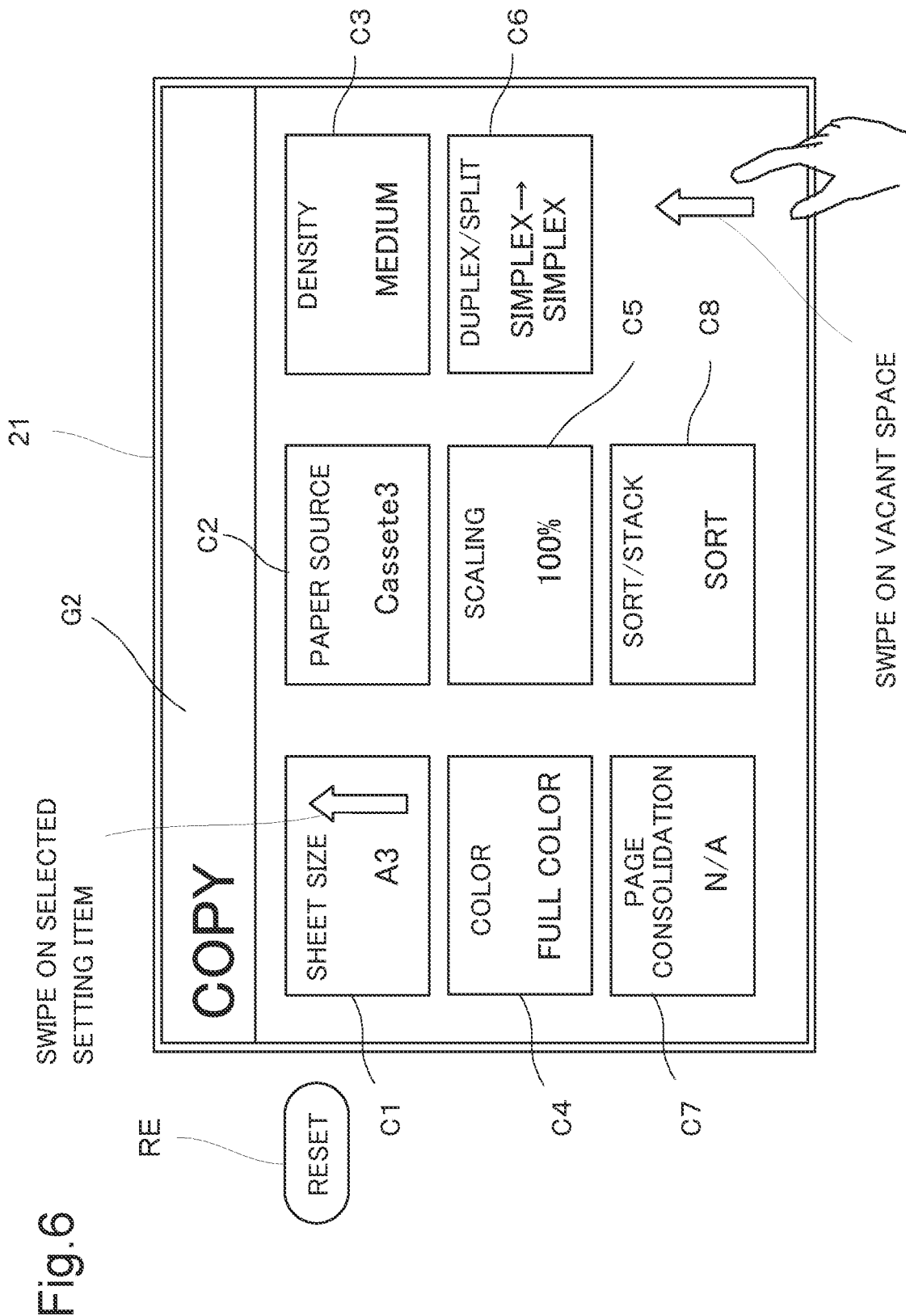
FIG. 6 is a schematic drawing showing a setup screen for a copying function, displayed on the display device.

For example, when the user touches the function key 41A associated with the copying function, the controller 31 detects, through the touch panel 23, the touch operation performed on the function key 41A, and causes the display device 21 to display a setup screen G2 for the copying function, as shown in FIG. 6. The setup screen G2 for the copying function shown in FIG. 6 includes a setting item C1 for the sheet size, a setting item C2 for the paper source, a setting item C3 for the density, a setting item C4 for color printing, a setting item C5 for the scaling factor, a setting item C6 for duplex or split printing, a setting item C7 for page consolidation, and a setting item C8 for sorting or stacking. The respective values specified for the setting items C1 to C8 originate from the initial value data table SD, and were loaded in the set value data table TD, when the image forming apparatus 10 was started up.

After the setup screen G2 for the copying function is displayed, the controller 31 decides whether a reset key RE on the operation device 22 has been pressed (S103). For example, when the reset key RE on the operation device 22 is not pressed, but another operation is performed instead, on the operation device 22 or the touch panel 23 (No at S103), the controller 31 executes the function corresponding to the other operation (S104). For example, upon detecting, through the touch panel 23, a touch operation on one of the setting items, the controller 31 selects the setting item touched, and changes the value of the setting item in the set value data table TD, according to the subsequent input through the operation device 22 or the touch panel 23. However, when the start key on the operation device 22 is touched, the controller 31 executes the copying job, according to the values of the respective setting items specified in the set value data table TD.

In contrast, when the reset key RE on the operation device 22 is pressed (Yes at S103), the controller 31 starts to measure a press duration time T of the reset key RE (S105), and compares the measured press duration time T with predetermined two times, namely a time t1 and a time t2, the latter being longer than the former (S106). The time t1, corresponding to the first time in the present invention, is for example two seconds, and the time t2, corresponding to the second time in the present invention, is for example five seconds.

Figure 7B:
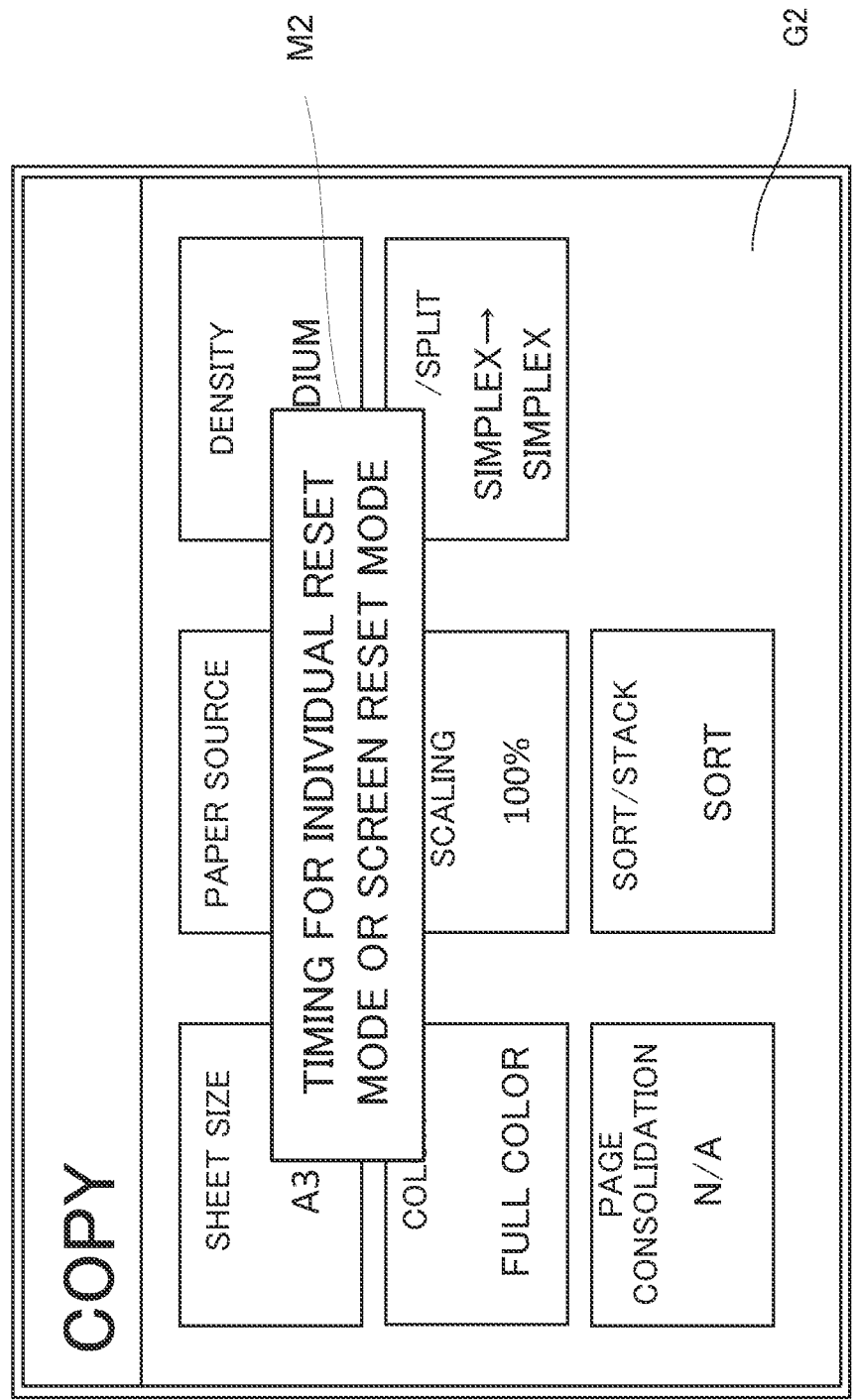
FIG. 7B is a schematic drawing showing another message displayed on the display device, according to the press duration time of the reset key.

During a period Δt1, before the press duration time T of the reset key RE reaches the time t1, the controller 31 causes the display device 21 to display a message M1, notifying to the effect that it is time to set the "total reset mode", on the setup screen, as shown in FIG. 7A. During a period Δt2, from the time t1 until the press duration time T of the reset key RE reaches the time t2, the controller 31 causes the display device 21 to display a message M2, notifying to the effect that it is time to set the "individual reset mode" or "screen reset mode", on the setup screen, as shown in FIG. 7B. Further, during a period Δt3 after the press duration time T of the reset key RE has exceeded the time t2, the controller 31 causes the display device 21 to display a message M3, notifying to the effect that it is time to set the "partial individual reset mode" or "partial screen reset mode", on the setup screen, as shown in FIG. 7C (S107).

While displaying one of the messages M1 to M3 during each of the periods Δt1, Δt2, and Δt3, the controller 31 decides whether the operation on the reset key RE on the operation device 22 has been finished (e.g., whether the press of the reset key RE has been finished), whether a swipe operation to be subsequently described has been performed, or whether the start key on the operation device 22 has been touched (S108), and sets one of the "total reset mode", the "individual reset mode", the "screen reset mode", the "partial individual reset mode", and the "partial screen reset mode", according to the timing that one of the mentioned decisions has been made (S109, S111, S125, S127, S129). Here, the period Δt1 corresponds to the first period, the period Δt2 corresponds to the second period, and the period Δt3 corresponds to the third period, in the present invention.

Therefore, the user can select one of the "total reset mode", the "individual reset mode", the "screen reset mode", the "partial individual reset mode", and the "partial screen reset mode", by stopping pressing the reset key RE, performing the swipe operation to be subsequently described, or touching the start key, while monitoring the message displayed on the setup screen of the display device 21, with the reset key RE kept pressed.

Total Reset Mode

Figure 8:
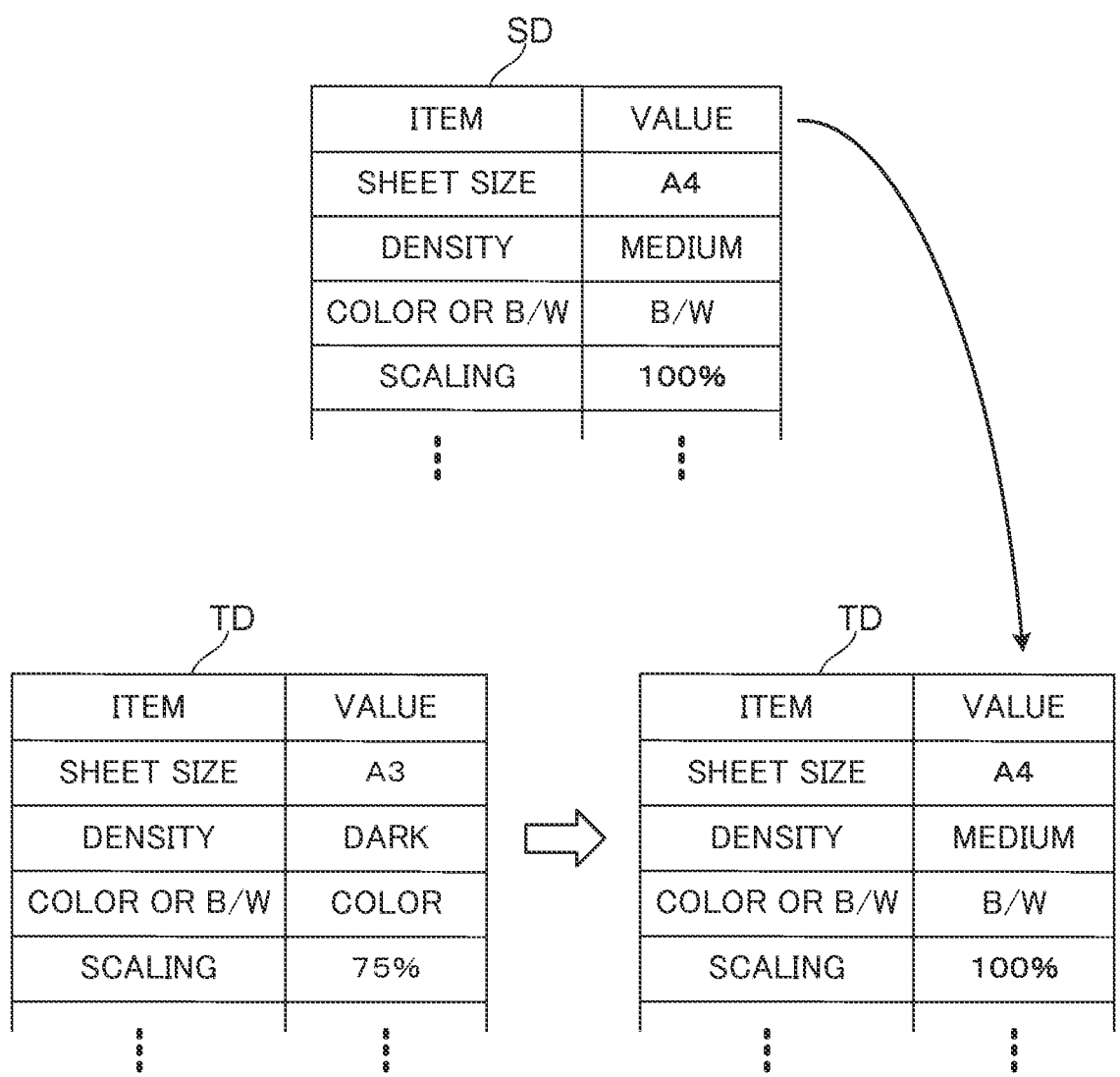
FIG. 8 schematically shows the tables for explaining the process of initializing the set value data table, under a total reset mode.

When the press duration time T of the reset key RE is finished in the period Δt1 ("Δt1" at S108), the controller 31 sets the total reset mode (S109), and initializes the respective values of all the setting items in the set value data table TD, by changing the values of the setting items in the set value data table TD to the values of the respectively corresponding setting items in the initial value data table SD, as shown in FIG. 8 (S110).

Thus, the user can initialize the respective values of all the setting items in the set value data table TD, by finishing the press duration time T of the reset key RE within the period Δt1.

Individual Reset Mode

The controller 31 sets the individual reset mode (S111), upon detecting, through the touch panel 23, the swipe operation performed on one of the setting items on the setup screen of the display device 21, or a touch on the start key of the operation device 22, while the press duration time T of the reset key RE is in the period Δt2 ("Δt2, Setting Item" at S108).

For example, when the controller 31 sets the individual reset mode, because of detecting the swipe operation on one of the setting items on the setup screen of the display device 21, while the press duration time T of the reset key RE is in the period Δt2 ("Swipe" at S112), the controller 31 changes the value of the setting item in the set value data table TD, on which the swipe operation was performed, to the value of the corresponding setting item in the initial value data table SD, as shown in FIG. 9, thus initializing the value of this setting item in the set value data table TD (S113). As result, for example, the value of the setting item C1 (Sheet Size), on the setup screen G2 shown in FIG. 6, is initialized.

Once the individual reset mode is set, the controller 31 maintains the individual reset mode for a predetermined period of time, despite the reset key RE not having been pressed, and initializes, upon detecting again the swipe operation on one of the setting items on the setup screen of the display device 21 (Yes at S114), the value of the setting item that has been swiped in the value data table TD (S113). Thereafter, the controller 31 extends the individual reset mode for the predetermined time, from the time of the second detection.

Although the individual reset mode is valid, when an operation for updating the value of the setting item on the setup screen of the display device 21 (operation different from swipe operation) is detected through the touch panel 23 (Yes at S115), the controller 31 updates the value of that setting item in the set value data table TD, according to the operation performed as above (S116), and extends the individual reset mode for the predetermined time, from the time that the operation for updating the value of the setting item was performed.

Figure 4A:
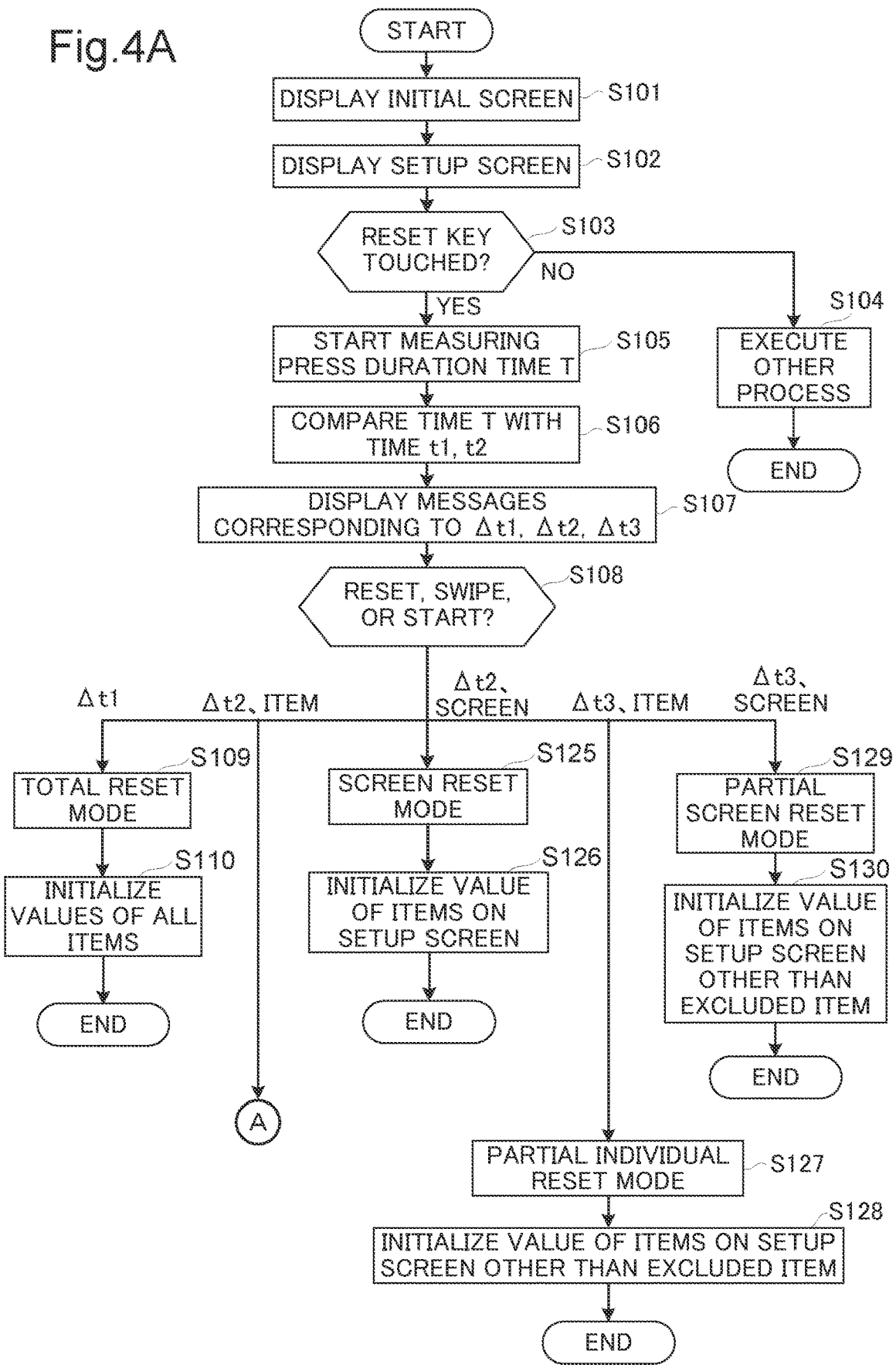
FIG. 4A is a flowchart showing a process of initializing values of setting items related to the operation of the image forming apparatus.
Figure 4B:
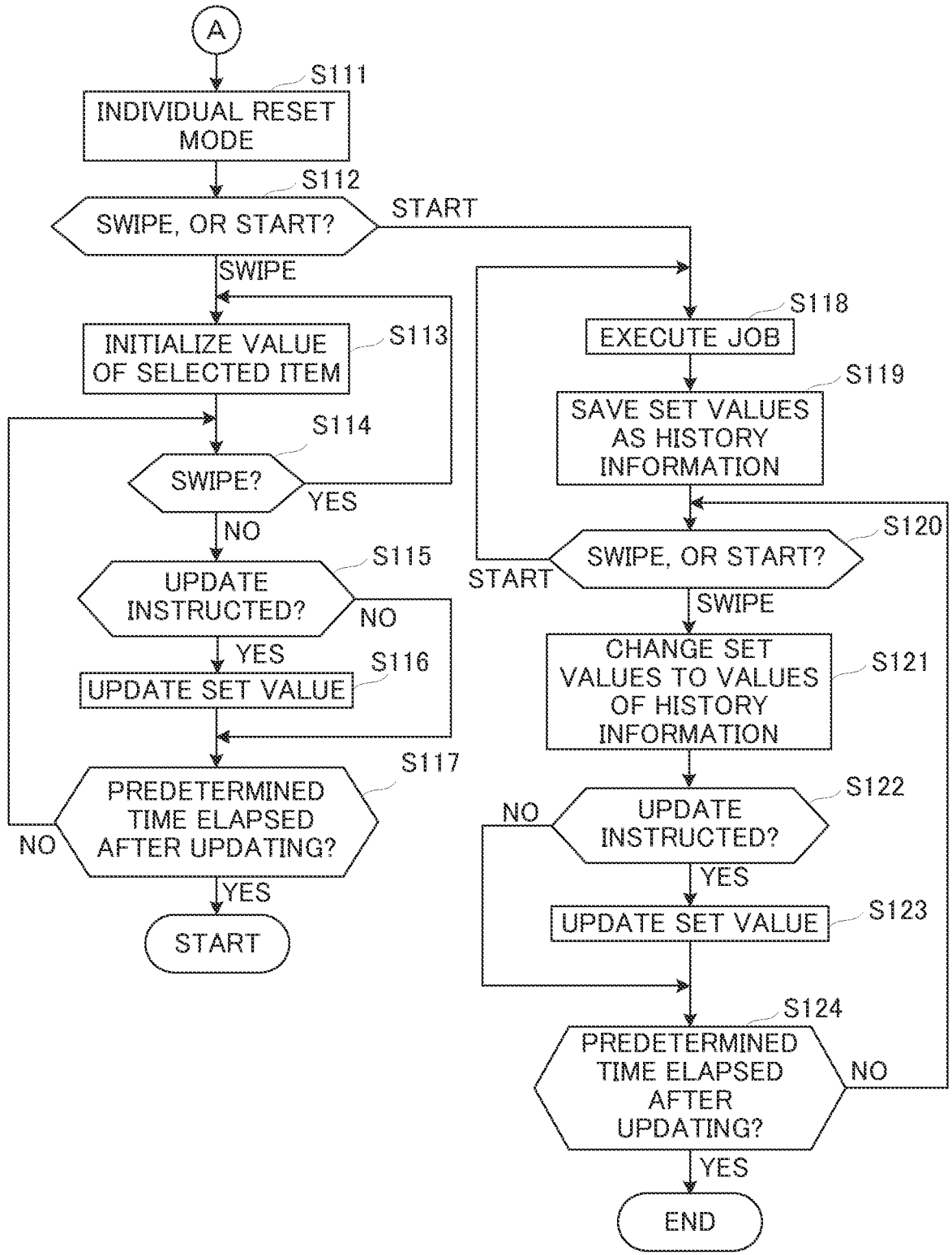
FIG. 4B is a flowchart showing a process subsequent to FIG. 4A.

When the predetermined time elapses (Yes at S117), the controller 31 finishes the individual reset mode, thus finishing the operation specified in FIG. 4A and FIG. 4B.

Thus, the user can initialize only the value of the desired setting item in the set value data table TD, by performing the swipe operation on the desired setting item, or update the value of the desired setting item in the set value data table TD, by performing the operation to update the value of the desired setting item.

In the case where the individual reset mode is set, because the start key of the operation device 22 has been touched while the press duration time T of the reset key RE is in the period Δt2 ("Start" at S112), the controller 31 executes the copying job, in response to the touch on the start key, according to the values of the respective setting items in the set value data table TD (S118). The controller 31 then writes the values of the respective setting items in the set value data table TD in the history data table HD, and saves those values therein (S119).

The controller 31 maintains the individual reset mode for the predetermined period of time, despite the reset key RE not having been pressed, and executes again, when the start key of the operation device 22 is touched again ("Start" at S120), the copying job according to the values of the respective setting items in the set value data table TD (S118). Then the controller 31 writes the values of the respective setting items in the set value data table TD again in the history data table HD shown in FIG. 3, to save those values therein (S119), and further extends the individual reset mode for the predetermined time, from the time that the start key was pressed.

In the case where the swipe operation on one of the setting items on the setup screen of the display device 21 is detected through the touch panel 23, while the individual reset mode is maintained ("Swipe" at S120), the controller 31 replaces the value of the swiped setting item in the set value data table TD, with the value of the corresponding setting item, saved first in the history data table HD, and deletes the value of that setting item in the history data table HD (S121). Thereafter, the controller 31 further extends the individual reset mode for the predetermined time, from the time of the swipe operation.

In the case where the operation for updating the value of the setting item on the setup screen of the display device 21 (operation different from swipe operation) is detected through the touch panel 23, while the individual reset mode is maintained (Yes at S122), the controller 31 updates the value of that setting item in the set value data table TD (S123), and extends the individual reset mode for the predetermined time, from the time that the operation for updating was performed.

When the predetermined time elapses after the touch on the start key of the operation device 22, or after the swipe operation (Yes at S124), the controller 31 finishes the individual reset mode, thus finishing the operation specified in FIG. 4A and FIG. 4B.

The mentioned operation from S118 to S124 is repeated, as long as the individual reset mode is maintained.

Figure 10C:
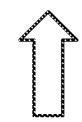
FIG. 10C schematically shows the tables for explaining another process of reinstating the values of the setting items of the set value data table, utilizing the history data table under the individual reset mode.
Figure 10D:
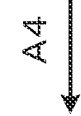
FIG. 10D schematically shows the tables for explaining another process of reinstating the values of the setting items of the set value data table, utilizing the history data table under the individual reset mode.

As described above, the user can execute the copying job according to the values of the respective setting items in the set value data table TD, by pressing the start key, and write the values of the respective setting items in the set value data table TD in the history data table HD, to save those values therein, as shown in FIG. 10A. The user can also update the value of the setting item in the set value data table TD as shown in FIG. 10B, by performing the operation to update the value of the setting item on the setup screen of the display device 21. Thereafter, the user can execute the copying job according to the values of the respective setting items in the set value data table TD, by pressing the start key, and write the values of the respective setting items in the set value data table TD, again in the history data table HD, to save those values therein, as shown in FIG. 10C. Further, the user can replace, by performing the swipe operation on one of the setting items on the setup screen of the display device 21, the value of the swiped setting item in the set value data table TD, with the value of the corresponding setting item first saved in the history data table HD, as shown in FIG. 10D. Thus, the user can optimally set the values of the respective setting items in the set value data table TD, while repeatedly executing the copying job, by updating or reinstating the values of the setting items in the set value data table TD.

Screen Reset Mode

The controller 31 sets the screen reset mode (S125), upon detecting, through the touch panel 23, the swipe operation performed on a vacant space on the setup screen of the display device 21 (e.g., region in the setup screen G2 shown in FIG. 6, other than the setting items C1 to C8), while the press duration time T of the reset key RE is in the period Δt2 ("Δt2, Screen" at S108). The controller 31 then selects the values of the respective setting items displayed on the setup screen of the display device 21 from the set value data table TD, and changes the values of the selected setting items to the values of the respectively corresponding setting items in the initial value data table SD, thus initializing the values of the setting items in the set value data table TD (S126). As result, for example, the respective values of the setting items C1 to C8, on the setup screen G2 shown in FIG. 6, are initialized.

Therefore, the user can select the values of the respective setting items displayed on the setup screen of the display device 21, and initialize the values of the respectively corresponding setting items in the set value data table TD, by performing the swipe operation on the vacant space on the setup screen of the display device 21, while the press duration time T of the reset key RE is in the period Δt2.

Partial Individual Reset Mode

When the swipe operation on one of the setting items on the setup screen of the display device 21 is detected through the touch panel 23, after the press duration time T of the reset key RE enters the ("Δt3, Setting Item" at S108), the controller 31 sets the partial individual reset mode (S127).

The controller 31 then selects the remaining setting items, other than the setting item swiped on the setup screen, and changes the respective values of the other setting items in the set value data table TD, to the values of the respectively corresponding setting items in the initial value data table SD, thus initializing the values of the other setting items in the set value data table TD (S128).

Therefore, the user can select, by performing the swipe operation on one of the setting items on the setup screen while the press duration time T of the reset key RE is in the period Δt3, the values of the remaining setting items on the setup screen, other than the swiped setting item, and initialize the values of the other setting items in the set value data table TD.

Partial Screen Reset Mode

When the swipe operation on the vacant space on the setup screen of the display device 21 is detected through the touch panel 23, after the press duration time T of the reset key RE enters the ("Δt3, Screen" at S108), the controller 31 sets the partial screen reset mode (S129).

The controller 31 then selects the values of the respective setting items displayed on another setup screen related to the setup screen currently displayed, other than the setting items on the currently displayed setup screen of the display device 21, and changes the values of the other setting items in the set value data table TD, to the values of the respectively corresponding setting items in the initial value data table SD, thus initializing the values of the other setting items in the set value data table TD (S130). In the case where, for example, a plurality of setup screens related to the copying function are formed in a layered structure, and the swipe operation is performed, when the display on the display device 21 is switched to one of those setup screens, on the vacant space on the setup screen being displayed, the setting items displayed on this setup screen are excluded, and the values of the other setting items, on the other setup screen related to the copying function, are selected and initialized.

Therefore, the user can select, by performing the swipe operation on the vacant space on the setup screen while the press duration time T of the reset key RE is in the period Δt3, the values of the other setting items displayed on the other setup screen related to the setup screen currently displayed, and initialize the values of the other setting items in the set value data table TD.

With the arrangement according to the foregoing embodiment, the user can selectively set one of the "total reset mode", the "individual reset mode", the "screen reset mode", the "partial individual reset mode", and the "partial screen reset mode", by properly pressing the reset key RE, performing the swipe operation, and pressing the start key as the case may be, and reset the values of the setting items in the selected mode.

Thus, with the arrangement according to the foregoing embodiment, the respective values of the plurality of setting items, related to the operation of the image forming apparatus 10, can be selectively initialized.

In the foregoing embodiment, the image forming apparatus 10 has been described as an embodiment of the electronic apparatus according to the present invention. However, the electronic apparatus according to the present invention is not limited thereto, but may be a different electronic apparatus, such as a computer, medical equipment, a car navigation system, and so forth. In addition, although the image forming apparatus according to the embodiment is exemplified by the multifunction peripheral, the present invention is also applicable to a different image forming apparatus, such as a copier, a printer, a facsimile machine.

Further, the configurations and processings described in the foregoing embodiments with reference to FIG. 1 to FIG. 10D are merely exemplary, and in no way intended to limit the present invention to those configurations and processings.

The invention claimed is:

1. An electronic apparatus comprising:
a controller including a processor and functioning through the processor executing a control program that sets a value for each of a plurality of setting items related to an operation of the electronic apparatus;
a display device that displays at least one of the setting items; and
an operation device to be operated by a user,
wherein the controller being configured to:
set the value of each of the setting items according to an input made through the operation device;
initialize the respective values of all the setting items, when a total reset mode is set through the operation device;
initialize, when an individual reset mode is set through the operation device, the value of the setting item about which resetting has been instructed through the operation device, out of the at least one of setting items displayed on a screen of the display device; and
initialize, when a screen reset mode is set through the operation device, the values of the at least one of setting items displayed on the screen of the display device, out of the plurality of setting items,
wherein the operation device includes a reset key, and
the controller starts to measure a press duration time of the reset key, when the reset key on the operation device is pressed, (i) causes the display device to display a message indicating that it is time to set the total reset mode, in a first period before the press duration time reaches a predetermined first time, and sets the total reset mode, when the reset key stops being pressed in the first period, and (ii) causes the display device to display a message indicating that it is time to set the individual reset mode or the screen reset mode, in a second period until the press duration time of the reset key reaches a predetermined second time, after the first time has elapsed, sets the individual reset mode, when a predetermined operation is performed through the operation device in the second period, and sets the screen reset mode, when a swipe operation is performed on a vacant space in the screen of the display device in the second period,
wherein the controller maintains the individual reset mode for a predetermined period of time, initializes, upon detecting the swipe operation on one of the at least one of setting items displayed on the screen of the display device during the individual reset mode, the value of the setting item that has been swiped, and extends the individual reset mode for the predetermined time from the time of the detection of the swipe operation.

2. The electronic apparatus according to claim 1, further comprising a storage device,
wherein the controller stores, when a job is executed under the individual reset mode, the values of the respective setting items used for execution of the job in the storage device as history information, and sets the value of the setting item to one of the values of the setting items in the history information stored in the storage device, when designating of the setting item is instructed through the operation device, at a time that a subsequent job is executed.

3. The electronic apparatus according to claim 1,
wherein the controller initializes the respective values of the remaining setting items displayed on the screen, other than the setting item on the screen of the display device, designated through the operation device, when a partial individual reset mode is set through the operation device.

4. The electronic apparatus according to claim 3,
the controller (iii) causes the display device to display a message indicating that it is time to set the partial individual reset mode, in a third period after the press duration time of the reset key exceeds the predetermined second time subsequent to the first time, and sets the partial individual reset mode, when the swipe operation on one of the at least one of setting items displayed on the screen of the display device is received through the operation device in the third period.

5. The electronic apparatus according to claim 1, wherein the controller initializes the respective values of other setting items to be displayed on another screen of the display device, other than the values of the at least one of setting items currently displayed on the screen of the display device, when a partial screen reset mode is set through the operation device.

6. The electronic apparatus according to claim 5, the controller (iii) causes the display device to display a message indicating that it is time to set the partial screen reset mode, in a third period after the press duration time of the reset key exceeds the predetermined second time subsequent to the first time, and sets the partial screen reset mode, when the swipe operation is performed on a vacant space in the screen of the display device in the third period.

7. The electronic apparatus according to claim 1, wherein, when the individual reset mode is set through the operation device, and another instruction, different from the instruction to reset the setting item on the screen of the display device, is made with respect to the setting item through the operation device, the controller executes an operation according to another instruction.

8. An image forming apparatus comprising:

the electronic apparatus according to claim 1; and an image forming device that forms an image on a recording medium.

* * * * *